Oct. 6, 1936.  E. G. GOODELL  2,056,266
APPARATUS AND PROCESS FOR WASTE LIQUOR RECOVERY
Filed June 17, 1933  5 Sheets-Sheet 1

Patented Oct. 6, 1936

2,056,266

UNITED STATES PATENT OFFICE 2,056,266

APPARATUS AND PROCESS FOR WASTE LIQUOR RECOVERY

Edward G. Goodell, Stevens Point, Wis.

Application June 17, 1933, Serial No. 676,267

20 Claims. (Cl. 23—48)

This invention relates to improvements in the recovery of waste liquors such as are obtained in the manufacture of sulphate and soda paper pulp.

More specifically this invention relates to improved methods and apparatus for recovering alkaline values and utilizing the heat content of black liquor solids, obtained by evaporation of waste liquor from the soda and/or sulphate processes of making paper pulp. The improved apparatus comprises a combined smelting furnace and boiler unit for the fusing off of alkaline values under reducing conditions and a thorough combustion of the carbonaceous and organic materials in the dried black liquor powder under oxidizing conditions in a distinct superimposed zone within the unit.

In my copending application Serial No. 601,626, filed March 28, 1932, I have described and claimed a method and apparatus for the recovery of alkaline values and utilization of heat content of waste liquors in which black liquor is concentrated and dehydrated by the sensible heat of gases obtained from the combustion of the dry black liquor powder previously produced. A combined smelting and boiler furnace is provided for fusing the alkaline values with minimum loss by oxidation and for the thorough oxidation (combustion) of the carbonaceous and organic matter in the dry black liquor powder for the generation of steam.

I have now devised modifications and improvements on the process and apparatus disclosed in my copending application above referred to, by means of which I am able to obtain even greater efficiencies and, in the treatment of waste liquors from the sulphate pulp process, can create even more distinct zones of reducing and oxidizing atmospheres than were capable of being produced in my prior process and apparatus.

In accordance with this invention, a fuel bed of black liquor solids is allowed to be built up in the furnace to the mouth of a black liquor powder feed line, so that the solids being fed to the furnace cannot drop or fall through the rising burning gases to the fuel bed but merely are pushed out on top of the fuel bed. This arrangement prevents the solid particles from being entrained in the rising gases of combustion and thereby permits the burning gases only to rise into the combustion zone of the boiler. The necessity of removing appreciable amounts of entrained black liquor solids in the gases after their passage through the primary boiler tubes is eliminated.

To further prevent the entrainment of powder in the rising gases of combustion, I may tap off hot inert gases from the boiler tube zone of the furnace, preferably beyond the primary boiler tubes, and blow these inert gases downwardly across the top of the fuel bed. A coacting down draft is thus produced which further eliminates entrainment of the powder in the stream of rising gases of combustion.

If desired, black liquor may be sprayed into the stream of tapped off inert gases at their point of entry into the furnace above the fuel bed. The spraying of the black liquor at this point makes it possible to directly dehydrate black liquor in the smelting furnace without oxidizing the alkaline values contained therein. At the same time the moisture content of the liquor creates a crust over the fuel bed and this also aids in preventing the black liquor powder from being entrained in the burning gases rising from the fuel bed.

As will be more fully hereinafter described the prevention of solids entrainment in the burning gases may be applied to furnaces in which the boiler tubes are separated from the smelting furnace without departing from the scope of this invention. I may also utilize solid or liquid foreign fuels in the smelting furnace to increase the steam generating capacity of the apparatus when necessary.

The hot gases tapped from the boiler tube zone may be used to serve as evaporating agents for highly concentrated black liquor sprayed into the furnace. The concentrated liquor thus evaporated may be burned in the fuel bed in the same manner that the solids evaporated outside of the furnace are burned. Since highly concentrated black liquor tends to become very viscous and semi-solid when cooled my invention includes a novel system of heaters and filters to maintain the liquor in fluid form before it is fed to the furnace.

The prevention of solids entrainment in the burning gases accomplished by my invention may also be applied to the rotary incinerator process of black liquor recovery without departing from the scope of this application.

The combined smelter and boiler unit of this invention can be operated to obtain temperatures over 2700° F. from the combustion of the black liquor solids. These temperatures are about 20% higher than can be obtained in other installations and make possible the generation of high temperature and high pressure steam. Thus small boilers with high ratings may be used.

It is therefore an object of this invention to provide a combined smelter and boiler furnace for the utilization of heat content of dry black liquor powder by burning the same under conditions producing complete oxidation while at the same time recovering the alkaline values from the black liquor without substantial oxidation.

Another object of this invention is to provide a process for carefully controlling the combustion of black liquor within a single unit providing reducing and oxidizing zones distinctly isolated from each other.

Another object of this invention is to provide a process and apparatus whereby dry black liquor is burned directly below boiler tubes for the generation of steam with an accompanying dehydration of black liquor above the fuel bed by means of hot gases taken above the combustion zone of the furnace.

Another object of this invention is to provide a process for burning dry black liquor powder and simultaneously dehydrating black liquor in the same unit without oxidation of the sodium compounds.

Another object of this invention is to provide a process and apparatus for handling highly concentrated black liquor in fluid form whereby the fluidity of the liquor is maintained and solid particles removed or redissolved before the liquor is dehydrated.

Another object of this invention is to provide a process and apparatus whereby partially concentrated black liquid is further concentrated by means of flue gases to a very high solid content but remaining in a fluid condition and in then evaporating the highly concentrated liquor in the smelting furnace while allowing the resulting solids to be deposited on the fuel bed in a substantially unburned condition.

Another object of this invention is to prevent solids entrainment in the burning gases in the smelting furnaces used in the conventional spray burning and rotary incinerator process of black liquor recovery.

Another object of this invention is to provide apparatus whereby the hot gases from the burning of foreign fuels may be added to the gases resulting from combustion of the black liquor solids without mixing the foreign fuels with the black liquor solids.

Another object of this invention is to provide a process of generating steam from the combustion of black liquor whereby peak load steam requirements may be served without the use of additional furnaces by the addition of auxiliary fuels such as gas, oil, coal or wood to the black liquor smelting furnace without interfering with the black liquor recovery process.

Other and further objects of this invention will become apparent as the description proceeds.

Figure 1:
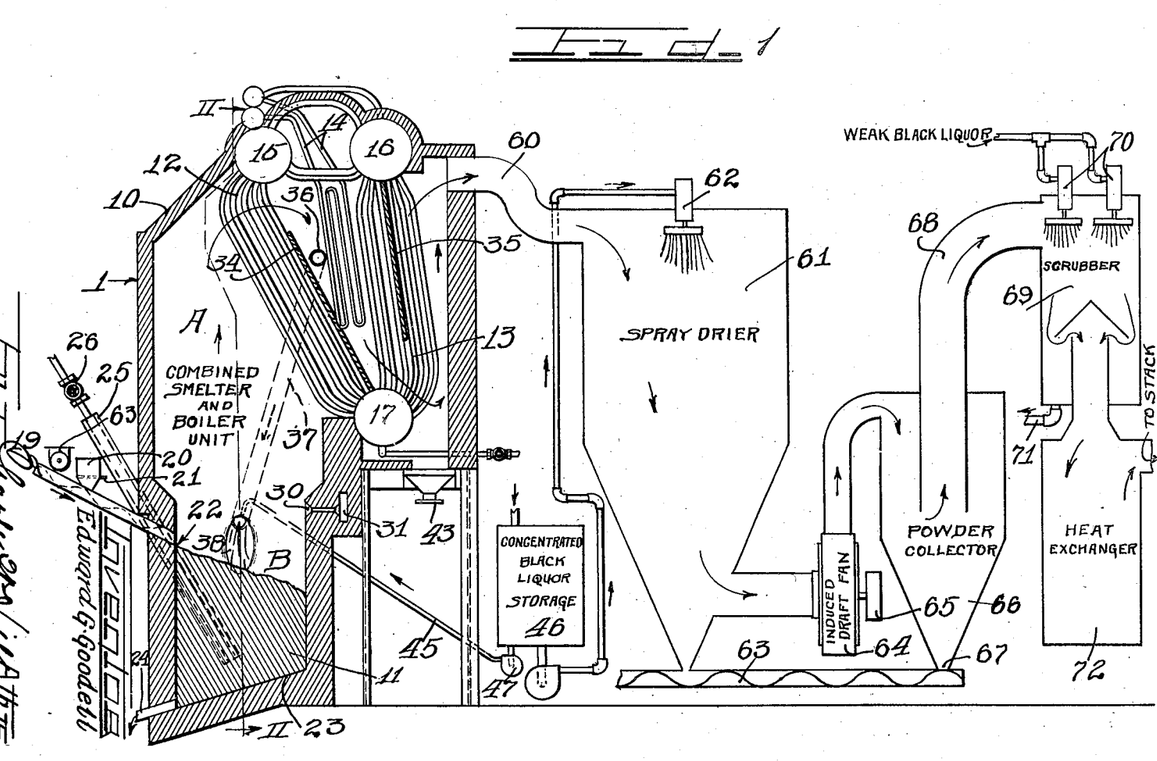
Figure 1 is a diagrammatical view, partly in cross section, of a preferred embodiment of this invention showing the manner in which dried black liquor powder is fed to the fuel bed of the furnace and the hot flue gases are tapped from near the top of the furnace to provide a dehydrating atmosphere for black liquor near the top of the fuel bed in the reducing zone of the furnace and the manner in which the main stream of the flue gases from the furnace is used to dehydrate and concentrate black liquor.
Figures 2, 3, 4:
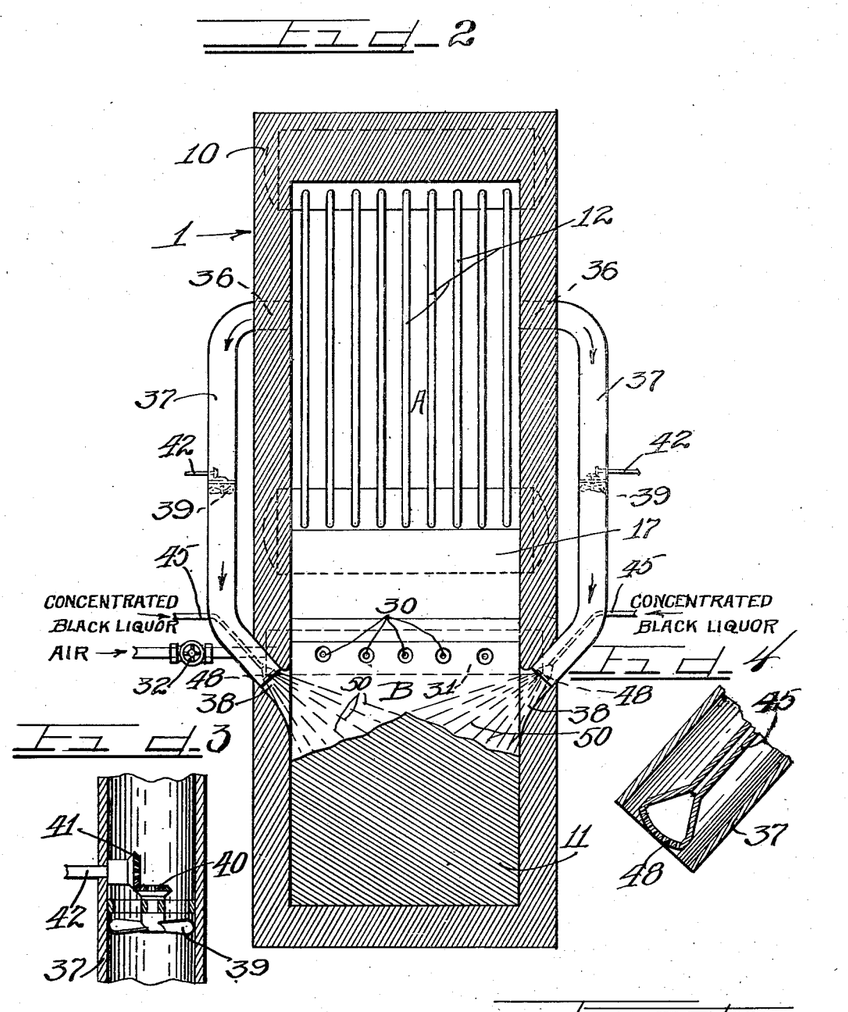
Figure 2 is a sectional view taken substantially along the line II—II of Fig. 1, showing the secondary air nozzles and the ducts for tapping part of the hot gases of combustion from the boiler tube setting down to the reducing zone of the fuel bed.
Figure 3 is an enlarged detail view showing the setting for a fan which may be used to blow the hot gases from the boiler setting down to the fuel bed zone of the furnace.
Figure 4 is an enlarged detail view showing a spray head for spraying black liquor into the reducing zone of the furnace.

In Figures 1 and 2, the reference numeral 1 indicates the combined smelter and boiler unit of this invention, having an insulated housing 10 for enclosing a fuel bed of dried black liquor 11 and the usual primary and secondary boiler tubes 12 and 13, respectively. If desired a superheating coil of boiler tubes 14 may be provided to superheat the steam generated in the boiler tubes 12 and 13. The boiler tubes are provided with the usual water and steam drums 15 and 16 and a mud drum 17.

Dried black liquor powder is fed to the fuel bed 11 through a spiral conveyor 19. Sodium sulphate to make up for the loss in the process is added to the dried black liquor powder through a hopper 20 having a slidable opening 21 in the bottom thereof to regulate the amount of feed to the black liquor powder conveyor.

The fuel bed 11 is allowed to build up to the mouth of the spiral conveyor 19 as shown at 22 in the furnace so that the entering black liquor powder does not drop as it enters the furnace but rolls onto the top of the bed without being oxidized.

The bottom of the furnace is sloped as shown at 23 so that the molten alkaline values may be thoroughly drained off through a tap hole 24.

A water cooled blow pipe 25 opens near the bottom of the fuel bed 11. Air is furnished to the fuel bed through this blow pipe in quantities just sufficient to maintain combustion but insufficient to create an oxidizing atmosphere. The preponderance of carbon monoxide gas generated in this zone prevents the oxidation of the alkaline values being fused off at 24. The air supplied through the blow pipe 25 may be regulated by means of a valve 26.

To eliminate the possible explosion hazard in case of clogging or failure of the jacket of a water cooled blow pipe extending into the hot furnace I may use a non-explosive material as a cooling medium. Examples of such materials are diphenyl, diphenyl oxide and non-explosive oils. The use of such materials will provide further heat economies because these cooling media can be circulated at high temperatures and their heat content can be used to heat boiler water etc. Water, on the other hand, cannot be safely used at high temperatures and must be discharged at temperatures too low for use in the plant.

The burning gases from the fuel bed arise in the smelter-boiler unit 1 into a combustion zone indicated by the letter A. This zone is created by introducing air through secondary air nozzles 30 preferably in the back wall of the boiler setting. The nozzles 30 are connected to an air supply (not shown) by means of a header pipe 31. As shown in Figure 2 the air supplied to these nozzles may be regulated by a valve 32. Air furnished through nozzles 30 furnishes sufficient oxygen for a thorough combustion of the rising burning gases from the fuel bed. The air blowing across the furnace at the height of the nozzles isolates the combustion zone A from the fuel bed zone which is indicated by the letter B.

The rising burning gases after receiving sufficient oxygen for thorough combustion pass around the primary boiler tubes 12 and over a baffle plate 34. The gases are then deflected downward around the secondary boiler tubes 13 and under another baffle plate 35.

In the space defined between the baffle plates 34 and 35 is positioned an opening 36 through each side wall of the furnace unit for receiving ducts 37 leading to enlarged openings 38 in the side walls of the furnace unit at a point slightly above the fuel bed 11.

Fans 39, connected thru gears 40 and 41 (see Fig. 4) to a drive shaft 42, driven by any suitable source (not shown), are provided to blow part of the inert gases from the zone between the baffles 34 and 35 to the reducing zone B of the furnace. The hot gases from near the top of the boiler are directed into the zone B of the furnace in such a manner that they will be distributed over the entire top of the fuel bed 11 as shown in Figure 2. These deflected hot gases help to prevent the entrainment of black liquor powder in the rising burning gases through zone A.

However, if any black liquor powder particles are entrained in the burning gases they may be removed from the furnace by means of a hopper 43 (Fig. 1) positioned under the secondary boiler tubes 13. The burning gases at this point have lost some of their velocity and the entrained powder particles drop due to gravity into the hopper 43. The black liquor powder so recovered may be fed to the furnace in any desirable manner.

If desired black liquor, preferably in a concentrated form, may be sprayed into the furnace above the fuel bed through the openings 38 in the side walls of the furnace. Black liquor feed lines 45 are provided for this purpose and may be fed from the concentrated black liquor storage tank 46 shown in Figure 1 by means of a pump 47. The feed lines 45 enter into the ducts 37 as shown in Figure 2. A spray head 48 is provided at the end of each feed line to atomize the black liquor into finely divided particles. The black liquor is thus evaporated by the hot inert gases from the ducts 37 and the rising burning gases from the fuel bed 11. The dried black liquor so produced is impinged upon the fuel bed 11 as shown at 50 in Figure 2 and greatly aids in defining a definite reducing zone for the fuel bed region of the furnace unit.

It is to be understood that any type of spray head 48 may be used which is capable of spraying black liquor in finely comminuted form without becoming clogged. If desired a power driven centrifugal type of spray head may be used.

While a simple type of fan blade is shown in Figure 3 in the duct 37 it is to be understood that any type of blower such as a rotary blower or an induced draft fan may be used in place of the fan blades 39. The speed of rotation of the blowers or fans should be capable of regulation so as to tap off only the desired amount of inert gases.

From the above description it is evident that the separation of zones A and B may be controlled to a nicety in the combined smelter and boiler unit. At the same time the black liquor is thoroughly burned within the furnace and the maximum heat absorption is obtained from the hot burning gases for the generation of steam within the boiler. The flue gases from the boiler are directed through a duct 60 as shown in Figure 1 into a spray drying cabinet 61 into which is fed, in finely comminuted form, concentrated black liquor from the storage tank 46. A spray head 62 which may be power driven is suitably used for introducing the finely divided black liquor into the spray drier 61. This part of the apparatus and the parts which follow are the same as is described in my copending application Serial 601,626.

Part of the black liquor which is dehydrated in the spray drier 61 drops at the bottom thereof into a spiral conveyor 63. The hot gases together with some entrained black liquor powder particles are drawn into an induced draft fan 64 driven through a pulley 65 from a suitable source (not shown). The gases are then passed into a powder collector 66 of the cyclone type wherein the entrained powder particles are separated from the gas and drop to the bottom of the collector 66 at 67. The spiral conveyor 63 transmits the powder from the powder collector and spray drier to the spiral conveyor feed line 19 for the furnace 1.

The gases from the powder collector rise through a duct 68 into a scrubber 69 wherein they contact weak black liquor in finely comminuted form from spray heads 70. The weak black liquor is concentrated in the scrubber by the hot gases and the concentrated liquor so produced is drained from the bottom through pipe line 71 into the concentrated black liquor storage tank 46.

The gases from the scrubber 69 which are now heavily moisture laden due to their dehydrating and evaporating functions in the spray drier and scrubber are directed into a heat exchanger 72 wherein their remaining sensible heat is utilized for heating a liquid such as weak black liquor or feed water for the boiler. The relatively cold gases are then passed through the stack and removed from the system.

Figure 5:
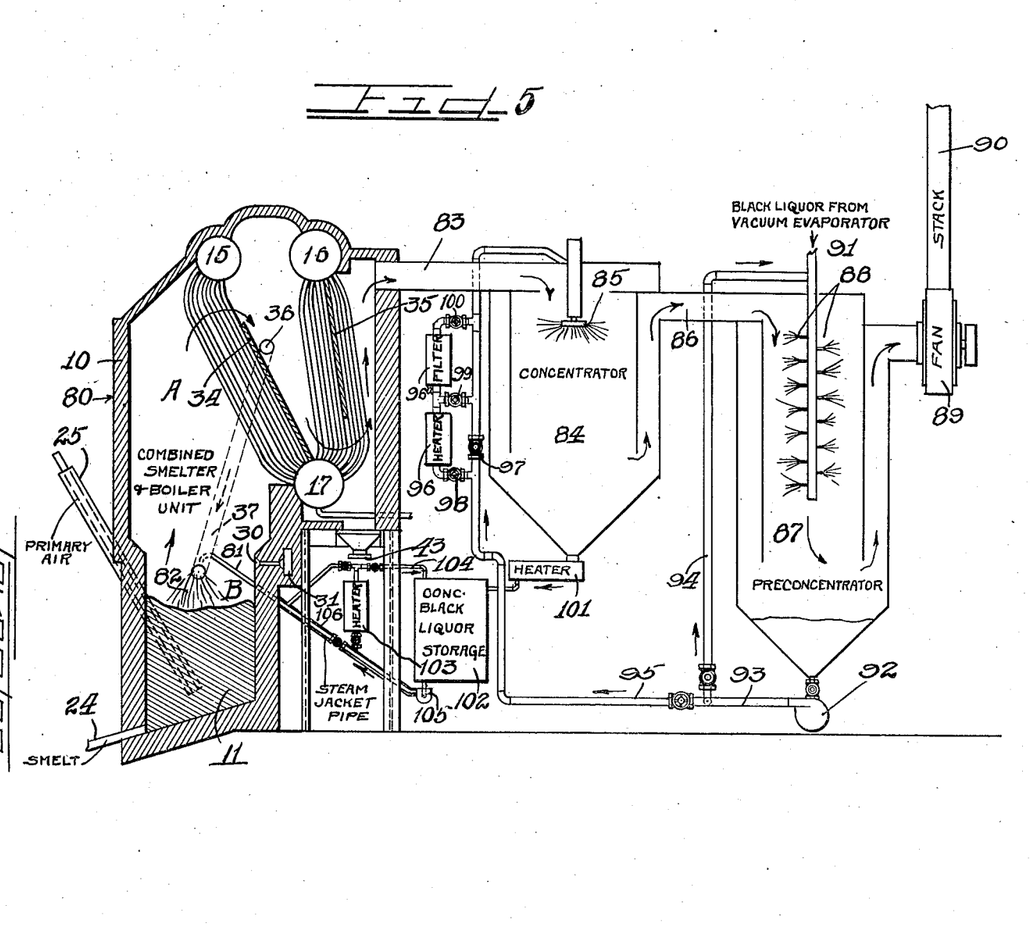
Figure 5 is a diagrammatical view, partly in section, of an alternative form of apparatus in which the dehydration of the black liquor outside of the smelter is eliminated and the highly concentrated black liquor fed to the furnace is maintained in fluid condition by heaters and filters.

In Figure 5 the reference numeral 80 indicates a combined smelter and boiler unit substantially identical with the unit shown in Figures 1 and 2. Identical parts have been numbered with the same reference numerals.

The smelter-boiler unit 80 is not provided with a feed for black liquor solids since the fuel is introduced in a heated liquid condition through the feed line 81. The highly concentrated black liquor is sprayed into the furnace as shown at 82. It is to be understood of course that an additional spray is also provided on the opposite side of the furnace. The sprayed black liquor is dehydrated by the hot recirculated inert gases from the boiler tube zone and the black liquor solids and semi-solids are deposited on the fuel bed where they are subsequently burned. The alkaline values, as in Figures 1 and 2, are drained through the tap hole 24.

The flue gases from the boiler are passed through a duct 83 into a concentrator 84 where part of their heat value is utilized to further concentrate concentrated black liquor from the spray 85. The gases are next passed through a duct 86 into a black liquor pre-concentrator 87 where their remaining heat value is used to evaporate black liquor sprayed through the spray devices 88. The gases are drawn from the pre-concentrator by means of an induced draft fan 89 and allowed to pass up the stack 90.

Black liquor which has been preferably partially evaporated by means of vacuum evaporators is fed to the pre-concentrator 87 through a pipe 91. The concentrated black liquor collected at the bottom of the pre-concentrator is pumped by means of a pump 92 into a pipe line 93 from which it may, if desired, be recirculated through a pipe line 94 back to the pre-concentrator until it is of the desired concentration. The concentrated black liquor is then directed into the concentrator 84 through a pipe 95. To maintain the liquid in a fluid condition and to prevent clogging of the spray head 85 in the concentrator 84 the black liquor may be passed through a heater 96 and a filter 96a before it is atomized in the spray 85. As is shown the heater 96 and the filter 96a may be readily cut in or out of operation as desired by a manipulation of the valves 97, 98, 99, and 100.

The highly concentrated black liquor from the concentrator 84 is passed through a heater 101 into the concentrated black liquor storage tank 102. To maintain the liquor in a fluid condition it may be circulated through a heater 103 and back to the liquor storage tank through a pipe line 104 by means of a pump 105. The pump 105 is also used to pump the concentrated black liquor through a steam jacketed pipe 106 into the feed line 81 within the furnace 80. It is desirable to have the pipe 106 heated to prevent a solidification of the highly concentrated liquor therein.

The structure shown in Figure 5 therefore illustrates a process for concentrating black liquor to such a high degree that it may be readily dehydrated to form solids in the furnace which solids are burned in the fuel bed of the furnace to generate heat for the production of steam and for the concentration of the black liquor. The system of heaters and filters which may be cut in and out of operation as desired and the arrangement of pre-concentrator and concentrators shown provide a system of apparatus that may be economically and efficiently operated.

Figures 6, 7:
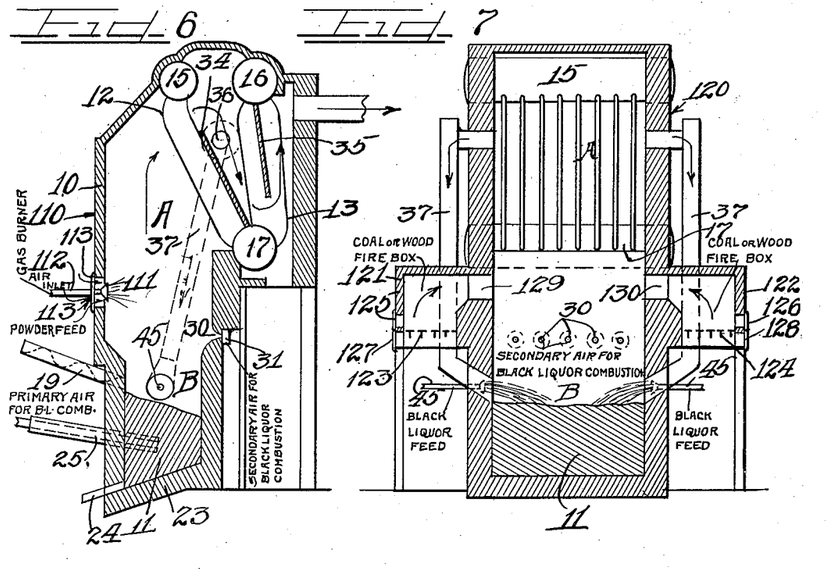
Figure 6 is a side sectional elevation view of a combined smelter and boiler unit similar to that shown in Figures 1 and 2 but including in addition means for adding a foreign liquid or gaseous fuel to the furnace to increase its heating capacity.
Figure 7 is a front sectional elevation view of a combined smelter and boiler unit according to this invention including additional means for burning solid auxiliary foreign fuels to increase the heating capacity of the furnace, and also to increase the evaporative capacity of the gases of combustion.

In Figure 6 the reference numeral 110 indicates a combined smelter and boiler unit according to this invention which is similar to the unit shown in Figures 1 and 2. Corresponding parts have been marked with the same reference characters used in Figures 1 and 2.

In addition the unit 110 is equipped with a spray head 111 preferably located in the front of the furnace. The spray head 111 is connected with a fuel supply through a pipe line 112. Air ports 113 surround the spray head to supply sufficient air for combustion of the fuel. This arrangement permits the use of auxiliary liquid or gaseous fuels to increase the heating capacity of the furnace so that sufficient steam may be generated in the boiler to take care of peak load requirements, and also to increase the drying capacity of flue gases. If necessary a plurality of spray heads 111 may be used.

In Figure 7 the reference numeral 120 indicates a combined smelter and boiler unit according to this invention in which solid auxiliary fuels may be burned under the boiler tubes to add to the heat generated by the combustion of the black liquor solids in the main fuel bed of the furnace. Parts corresponding with those disclosed in Figure 2 have been numbered with the same reference numerals.

In addition to the structure shown in Figure 2 there are provided fire boxes 121 and 122 on the sides of the furnace. Grates 123 and 124 are provided at the bottoms of the fire boxes 121 and 122 respectively to support solid fuels such as coal or wood having solid combustion products or ashes. The solid fuels may be fed to the fire boxes 121 and 122 through furnace doors 125 and 126 while the ashes may be removed from ash pits located below the grate through doors 127 and 128 respectively. The gaseous products of combustion from the burning of the solid fuels are mingled with the gaseous products of combustion from the fuel bed 11 as the former are drawn through the ports 129 and 130 located in the furnace walls.

In order to furnish ample furnace volume for the complete combustion of all the gases the distance between the points A and B in the unit is preferably increased. The auxiliary fire boxes need be used only to serve peak steam requirements for the boiler and if desired only one of the fire boxes may be used. This arrangement prevents ashes from the auxiliary fuels from commingling with the black liquor solids while at the same time the heat of the auxiliary fuels is utilized in the same manner as the heat of combustion of the black liquor solid is utilized.

Figures 8, 9:
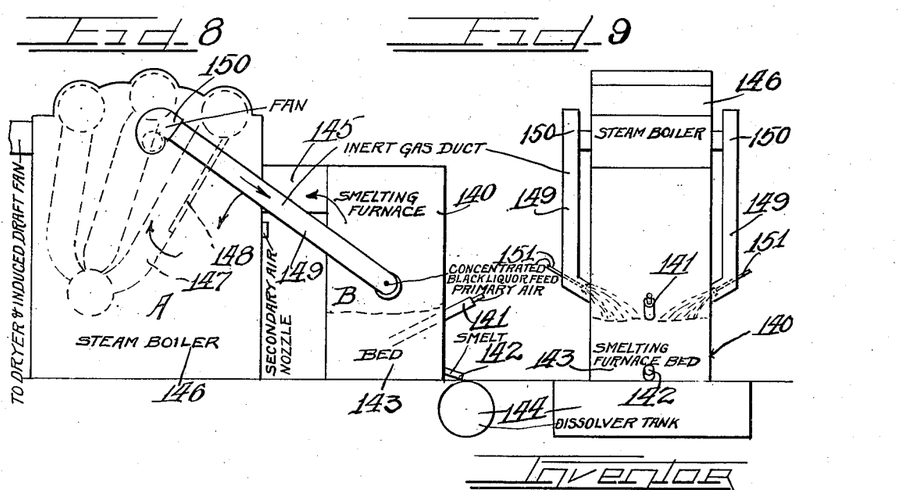
Figures 8 and 9 are side and front elevational views, respectively, of a conventional separated boiler and smelter unit showing the manner in which the hot gases from the boiler tubes may be tapped off and blown down on top of the smelter fuel bed together with a concentrated black liquor spray if so desired.

In Figures 8 and 9 the reference numeral 140 indicates a smelting furnace for the combustion of sprayed black liquor according to the conventional spray burning process. By this process black liquor of a moisture content of 25% to 50% is sprayed through the sides or top of the furnace and completely burned within the furnace by means of primary air at bottom of furnace and secondary air at a point or points higher up in the furnace. Water and organic volatiles are driven off and the latter burned simultaneously, the carbonaceous residue in incandescent state falling to the bottom of the smelter, and the gaseous products of combustion passing through flue 145 to boiler 146 containing the usual boiler tubes 147 and baffle plate 148.

In contrast to such procedure my process provides as an evaporating agent hot inert gas drawn from between the boiler tubes by fans 150 and delivered to smelting furnace 140 through ducts 149. Black liquor is sprayed through pipes 151 into this stream of hot inert gas at its entrance to the furnace. Thus the black liquor solids are projected to bed 143 of the furnace in substantially unchanged condition except as to moisture content instead of being burned in suspension according to prior methods. According to the conventional spray burning practice the combustion of volatiles in the upper part of smelter 140 and the combustion of residual carbonaceous matter in the lower part of the smelter 140 results in excessively high temperatures within the smelting furnace into which high temperature oxidizing zone the black liquor is sprayed. The violent expansion and combustion which follows tends to disrupt the sprayed particles of black liquor resulting in sublimation and separation of substantial part of their soda content into a fine dust which is entrained in the combustion gases in an unreduced state. By my process the admixture of inert gas with the sprayed black liquor retards combustion and lowers the temperature within the smelter thus avoiding appreciable sublimation and entrainment of soda solids.

Figure 10:
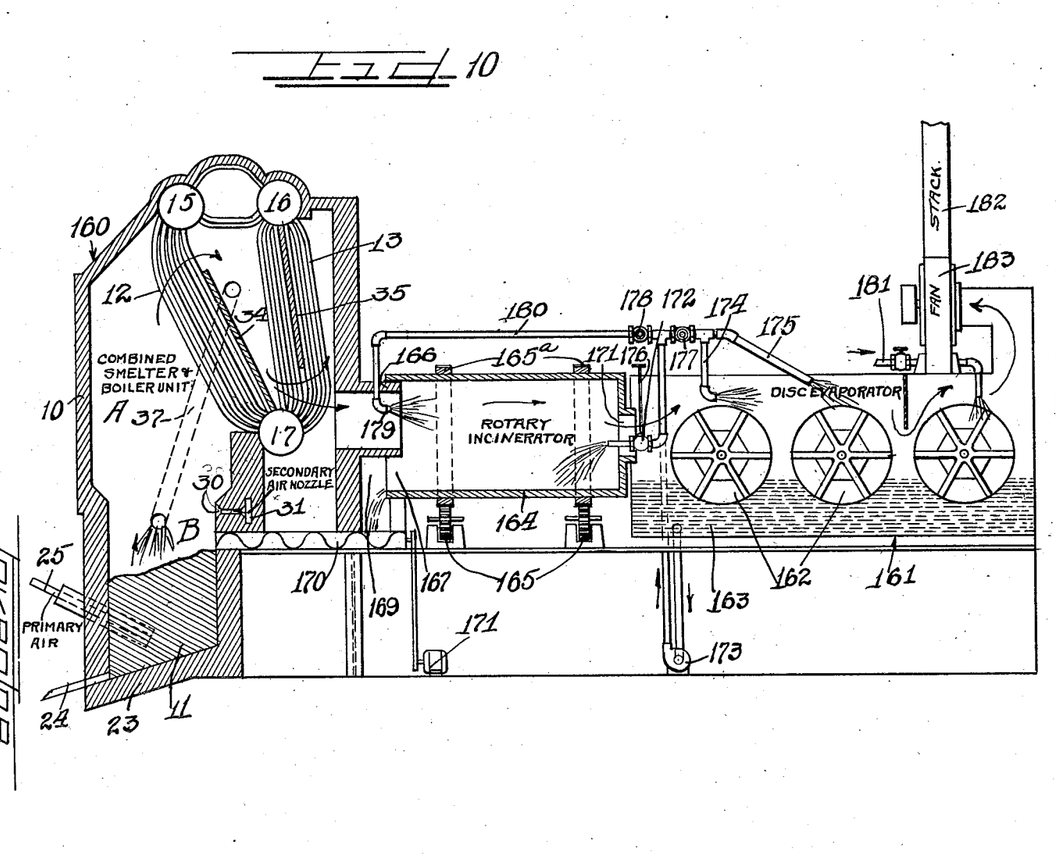
Figure 10 is a diagrammatical view, partly in cross section, showing the manner in which the combined smelter and boiler unit of this invention may be set up with apparatus used in the rotary incinerator process of black liquor recovery.

In Figure 10 the reference numeral 160 indicates a combined smelter and boiler unit according to this invention which is adapted to be used in connection with a rotary incinerator black liquor recovery system. The unit 160 comprises the usual steam, water and mud drums 15, 16 and 17 which are more fully described in Figures 1 and 2 together with the conventional primary and secondary boiler tubes 12 and 13. Corresponding parts are marked with the same reference characters used in Figures 1 and 2.

As is known, the rotary incinerator apparatus for black liquor recovery comprises a disk evaporator 161 provided with a plurality of disks 162 which revolve and pick up films of the liquor 163 in the pond at the bottom of the evaporator. This disk evaporator is of any well known type and does not form part of this invention.

The rotary incinerator is an inclined horizontal cylinder 164 rotating on and driven by gears 165 which mesh with ring gears 165a secured to the outside periphery of the incinerator 164.

The rotary incinerator 164 is provided with an open end 167 for receiving a duct 166 from the furnace 160. The duct 166 does not extend to the bottom of the incinerator and thereby provides a passage 169 for allowing the black liquor solids from the rotary incinerator to drop into a spiral conveyor 170 which is driven by a motor 171 and feeds the solids to the fuel bed 11 of the smelter 160.

The other end of the rotary incinerator 164 is provided with a restricted opening 171 engaging with a corresponding opening in the disk evaporator 161 for permitting the passage of hot gases therethrough and for receiving a valved nozzle 172. The concentrated black liquor from the pond 163 in the disk evaporator 161 is pumped by means of a pump 173 into the valved nozzle 172 and thus into the rotary incinerator 164. If a higher concentration of black liquor is required the liquid in the pond 163 may be recirculated by means of the pump 173 into nozzles 174 and 175 arranged to direct a stream of the liquor against the disk evaporators 162. The recirculation and/or feed of black liquors to the rotary incinerator is controlled by manipulation of the valves 176 and 177. In addition, if it is desired to spray some of the concentrated black liquor into the stream of gases entering the rotary incinerator 164 from the smelter-boiler unit 160 the valve 178 may be opened to allow some of the black liquor to flow through a pipe line 180 and out of a nozzle 179 located in the duct 166.

The disk evaporator is supplied with black liquor through a valved pipe line 181. The black liquor supply is preferably obtained from vacuum evaporators in which part of the water content of the black liquor has already been removed.

From the above description it is evident that the black liquor solids and semi-solids from the rotary incinerator are fed through the spiral conveyor 170 into the fuel bed 11 of the smelter furnace. Sufficient air for combustion of the solids is supplied to the fuel bed 11 through the blow pipe 25 and the smelted alkaline values obtained are tapped off through the tap hole 24 in the same manner as described for the smelter unit shown in Figures 1 and 2.

The gases of combustion rise through zone B of the furnace in a reduced condition. Upon reaching zone A of the furnace they are supplied with additional air through the secondary air nozzles 30 for thorough combustion. The gases then travel around the boiler tubes 12 and 13 where part of their sensible heat is utilized to generate steam. Upon leaving the boiler tubes 13 the gases are directed into the rotary incinerator for dehydrating the concentrated black liquor in the incinerator. The remaining sensible heat of the gases is utilized in the disk evaporator for a pre-concentration of the black liquor before it is fed to the rotary incinerator. After leaving the disk evaporator 161 the gases are blown into a stack 182 by means of an induced draft fan 183.

Entrainment of solid particles in the rising gases of combustion from the fuel bed 11 is prevented by means of the streams of gases tapped off from the boiler zone region of the furnace down on top of the fuel bed through pipe lines 37.

The apparatus shown in Figure 10 clearly illustrates that the combined smelter and boiler unit of this invention is readily adapted to serve rotary incinerator apparatus of the conventional type without redesigning the apparatus. The use of my improved smelter and boiler furnace permits greater efficiency in the operation of the rotary incinerator and also permits the use of old conventional apparatus without redesigning the entire recovery plant.

From the above description it is evident that the present invention is an improvement on the process and apparatus disclosed by the prior art and in my prior application Serial 601,626 in several important features which may be listed as follows:

(1) The fuel bed is allowed to build up directly to the base of the black liquor powder feed line so as to prevent oxidation of the entering black liquor powder and entrainment of the powder in the rising burning gases.

(2) The oxidation and reduction zones of the smelter-boiler unit are distinctly defined from each other and separated by directing hot inert gases from the boiler tube zone of the furnace down on top of the fuel bed.

(3) The tapping of inert gases from the boiler tube zone down on top of the fuel bed aids in preventing entrainment of black liquor powder in the rising burning gases.

(4) Concentrated black liquor is sprayed on top of the fuel bed and substantially dehydrated by the hot inert gases from the boiler tube zone of the furnace. This tends to hold the top of the fuel bed in position by forming a crust or denser layer of black liquor solids thereon, and prevents entrainment of black liquor powder in the arising burning gases.

(5) The relative positioning of the boiler tubes in a combustion zone directly above the reducing fuel bed zone in the same unit permits maximum utilization of the heat content of the black liquor without loss by oxidation of the alkaline values contained therein.

(6) The combined spray burning and spray drying features of the system impart flexibility to the process and cooperate to produce efficiencies heretofore not attainable in waste liquor recovery systems.

(7) The combined smelter and steam boiler unit of this invention is readily adaptable for use with any black liquor concentration apparatus and greatly increases the efficiencies of known systems.

(8) Apparatus for the prevention of solids entrainment in the hot gases of combustion according to my invention may be used on all types of smelters and boilers whether isolated or combined.

(9) Foreign fuels, either solid or gaseous, may be used as auxiliary sources of heat without contaminating the black liquor solids being burned.

The term "alkaline metal values" used throughout the specification and in the following claims refers to those alkali metal compounds which are dissolved in the original cooking liquors for the production of paper pulp. Examples of the alkali metal compounds used in cooking liquors for pulp production are sodium hydroxide, sodium sulphide, sodium sulphate and the like.

I am aware that many changes may be made and numerous details may be varied through a wide range without departing from the principles of this invention, and I, therefore, do not purpose limiting the patent granted hereon otherwise than necessitated by the prior art.

I claim as my invention:

1. The process of recovering alkali metal values from black liquor solids and simultaneously utilizing their heat content without loss of radiant heat which comprises burning black liquor solids in the bed of a combined smelting and boiler furnace maintained under a reducing atmosphere, allowing the burning gases produced to rise, blowing an inert gas down against the fuel bed from a level immediately above the bed to prevent entrainment of solids in the rising burning gases, supplying additional air at a point above that where the inert gases enter for the thorough combustion of the burning gases and directly contacting the gases of combustion with a steam generator located above the fuel bed.

2. The process of recovering alkali metal values and efficiently utilizing the heat content of waste liquor which comprises burning dehydrated waste liquor solids in a relatively deep bed, supplying an amount of air to said burning bed sufficient to maintain combustion without creating oxidizing conditions, supplying additional oxygen to the rising burning gases, creating distinct combustion and reducing zones by blowing against said bed an inert gas from a point immediately above said bed but below the point at which oxygen is added to the rising burning gases and utilizing the heat of combustion for the generation of steam and dehydration and evaporation of further quantities of waste liquor.

3. The process of efficiently utilizing the heat content of a dehydrated black liquor powder without destroying the alkali metal values contained therein, which comprises supplying the dried black liquor powder to a smelting furnace directly on top of the fuel bed therein, supplying sufficient air to maintain combustion in said fuel bed without creating oxidizing conditions, fusing off the alkaline values from the fuel bed, allowing the gases of combustion to rise, supplying additional air for thorough combustion of said gases in a separate zone from the fuel bed zone, conveying inert flue gases tapped off from above the combustion zone to the fuel bed zone and blowing said gases down on the fuel bed from a point just above the fuel bed to prevent entrainment of solids in the arising burning gases and to create a distinct line of separation between the fuel bed and combustion zone of the furnace.

4. The process of burning dried black liquor powder containing substantially all of the alkali metal values and heat content of black liquor to recover therefrom the alkali metal values and simultaneously efficiently utilize the heat content without loss of radiant heat which comprises forming a relatively deep bed of partially burning black liquor solids, pushing black liquor powder on top of said bed, supplying a limited amount of air to said bed sufficient to maintain combustion without creating oxidizing conditions, allowing the burning gases to rise from said bed, supplying an additional amount of air to said rising burning gases to effect their thorough combustion, directly contacting the resulting gases of combustion with a steam generator located above the fuel bed in the same unit, conveying hot flue gases from the steam generator to the top of the fuel bed, blowing said gases over the fuel bed and spraying a concentrated black liquor in the current of blown flue gases produced to dehydrate said concentrated liquor and prevent entrainment of black liquor solids in the rising burning gases.

5. The process of regenerating black liquor which comprises spraying from a point just above the top of a bed of black liquor solids in a combined smelter and boiler unit a concentrated black liquor in finely comminuted form, conveying inert gases from the top of said unit in the boiler zone thereof downwardly out of contact with the rising gases in the smelter, introducing said conveyed gases immediately above said bed of black liquor solids to envelope said comminuted black liquor sprayed therein and to prevent entrainment of the black liquor in the rising burning gases, pushing dried black liquor powder on top of the bed below the point of entry of the concentrated black liquor and inert gases, supplying sufficient air to said bed for maintaining combustion under reducing conditions therein and supplying additional air to the rising burning gases from said bed at a level above the level where the concentrated black liquor and inert gases are introduced to thoroughly burn the gases in direct contact with the boiler.

6. A combined smelter and boiler unit for the regeneration of black liquor which comprises a top boiler drum, a vertical retort having a relatively high elongated front wall supporting said top boiler drum, a boiler mud drum, a shorter rear wall for supporting said mud drum, a container defined by the lower part of said front wall and said rear wall for a bed of black liquor solids, boiler tubes connecting said drums, a blow pipe in said container near the bottom thereof for supplying a limited amount of air to the bed, air nozzles in said rear wall above the bed for supplying additional air to the rising gases from the bed for their thorough combustion before they contact said boiler tubes for the generation of steam therein, a conveyor for dried black liquor powder extending through said front wall for pushing said powder on top of the bed, and ducts for transmitting hot flue gases from beyond the boiler tubes down on top of the bed to prevent entrainment of solids in the rising gases.

7. A combined smelter and steam generator for use in black liquor recovery systems which comprises a relatively deep furnace bed for black liquor solids, a sloping bottom for said bed, an opening in the lower end of said sloping bottom for removal of molten alkaline values recovered from the black liquor, means for supplying a limited amount of air to said bed, means above said bed for supplying additional amounts of air to the smelter, boiler tubes directly over the furnace bed in spaced relation therefrom, means beyond said boiler tubes for conveying a predetermined amount of hot flue gases down to the top of the bed out of contact with the gases rising from the bed, means for introducing the conveyed gases over the top of the fuel bed, and spray means for injecting in highly comminuted form, a concentrated black liquor in the stream of so introduced flue gases.

8. A combined smelter and steam generator for use in recovering black liquor values which comprises a single housing for a fuel bed zone of black liquor solids and a combustion zone containing boiler tubes, means in said fuel bed zone for supplying a limited amount of air thereto, means above said fuel bed zone for supplying additional air, ducts communicating with the combustion zone beyond the boiler tubes thereof and terminating near the top of the fuel bed zone below the means for supplying additional air for conveying flue gases from the boiler zone down on the fuel bed to prevent entrainment of solids in the gases rising from the fuel bed and create a distinct line of separation between said zones.

9. The process of regenerating black liquor and utilizing its heat content which comprises burning the black liquor solids under reducing conditions in a relatively deep bed below a steam generator, draining the fused alkaline values from the bottom of said bed, allowing the partly burned gases to rise from the bed, adding sufficient air to the rising gases for their thorough combustion, conveying part of the burned gases from the steam generator region to the top of the bed introducing said inert gases on top of said bed to prevent solids entrainment in the rising burning gases and burning a fluid fuel in the burning gas stream at a point below the steam generator whereby the heat from the gases of combustion from said fuel and the heat from the gases of combustion of the black liquor are used directly to generate steam.

10. The process of recovering alkali values and utilizing the heat content of black liquor which comprises burning black liquor solids in a relatively deep bed, spraying highly concentrated black liquor over the bed, introducing a limited amount of air to the bed for partial combustion of the black liquor solids and fusion of the alkali values, draining the fused alkali values from the bottom of the bed, allowing the partially burned gases to rise, introducing a sufficient amount of air above the fuel bed to the rising burning gases for their thorough combustion, burning an auxiliary solid fuel in a separate fuel bed, allowing the hot gases of combustion from the auxiliary fuel to mingle with the gases of combustion from the black liquor solids fuel bed, utilizing the heat content of both gases to generate steam, tapping off some of the inert burned gases, conveying the tapped gases out of contact with the rising burning gases down to the top of the bed and introducing said gases with said sprayed black liquor.

11. The process of preventing solids entrainment in the rising burning gases of combustion in a black liquor recovery smelting furnace and steam generator plant which comprises tapping off hot gases of combustion from the steam generator region and conveying said gases downwardly out of contact with the rising burning gases to the top of the black liquor solids fuel bed and blowing said conveyed gases down against the fuel bed.

12. A process for regenerating black liquor and efficiently utilizing the heat content of black liquor which comprises burning the black liquor solids in a relatively deep bed in a smelting furnace maintained under reducing conditions, allowing the partially burned gases of combustion from the bed to circulate around boiler tubes in a steam generator, introducing a sufficient amount of air to the boiler tube region to complete combustion of the gases, conveying part of the inert gases of combustion from the steam generator region to the top of the fuel bed out of contact with the gases in the furnace, blowing said conveyed gases down on the fuel bed, and spraying highly concentrated black liquor into the stream of inert gases, said stream of gases and said spray cooperating to prevent solids entrainment in the rising burning gases from the bed.

13. A process for recovering alkali values and utilizing the heat content of black liquor which comprises burning the black liquor in a relatively deep bed in the presence of a limited amount of air, allowing the partially burned gases of combustion to rise from the bed, supplying additional air to the rising burning gases to permit thorough combustion of the same, circulating the air and burning gases around the boiler tubes of a steam generator, conveying out of contact with the furnace gases some of the hot and now inert gases from the steam generator region to the top of the bed, blowing said gases over the bed, spraying highly concentrated black liquor into the stream of hot inert gases to retard oxidation of the black liquor solids and prevent solids entrainment in the gases rising from the bed, and utilizing the remaining heat value of the gases from the steam generator to concentrate the black liquor to a sufficiently high solid content so that it may be directly introduced into the smelting furnace as fuel.

14. A process for regenerating and utilizing the heat content of black liquor which comprises spraying highly concentrated black liquor over the fuel bed of a smelting furnace, supplying a limited amount of air to the fuel bed to partially burn the black liquor solids, draining off the fused soda compounds from the black liquor solids, allowing the gases of combustion to rise from the fuel bed, supplying additional air to the rising burning gases, circulating the gases around primary and secondary boiler tubes of a steam generator, tapping off part of the gases between the primary and secondary tubes of the steam generator, conveying said gases out of contact with the furnace gases down on to the top of the fuel bed, introducing the conveyed gases over the fuel bed to prevent solids entrainment in the rising burning gases, and utilizing the remaining heat value of the gases emerging from the steam generator to concentrate black liquor in several stages to a high solid content and maintaining the highly concentrated liquor in liquid form by the air of heaters and filters.

15. A process for the regeneration and utilization of the heat content of black liquor which comprises maintaining a bed of black liquor substance in a smelting furnace, admitting a limited amount of air to said bed for partial combustion of the black liquor under reducing conditions, draining off the fused soda compounds from the bottom of the bed, supplying additional amounts of air at a point above the bed for completing the combustion of gaseous products rising from the bed, utilizing the heat of combustion of said gases for producing steam in a steam generator, utilizing the remaining heat value of said gases for concentrating black liquor in a rotary incinerator and disk evaporator and increasing the evaporative efficiency of said incinerator and disk evaporator by spraying black liquor therein.

16. A process for the recovery of alkali values and utilization of the heat content of black liquor which comprises maintaining a bed of black liquor substance in a smelting furnace, admitting a limited amount of air to the bottom of said bed for partial combustion under reducing conditions of the organic content of the black liquor substance, allowing the gases of combustion to rise from the bed, supplying additional air to said gases for their thorough combustion, circulating the gases around boiler tubes in a steam generator for the direct production of steam, utilizing the remaining sensible heat content of the gases for the concentration and evaporation of black liquor in a rotary incinerator and disk evaporator, conveying the concentrated black liquor solids from the rotary incinerator to the smelting furnace and preventing entrainment of solids in the rising burning gases from the smelting furnace bed by conveying inert gases from the steam generator region downwardly out of contact with the furnace gases to the top of the fuel bed and blowing said conveyed gases down on top of the bed.

17. Apparatus for the regeneration of black liquor comprising, in combination, a combined smelter and boiler unit, a spray concentrator for black liquor, a preconcentrator for weak black liquor, conduits for conducting the hot gases of combustion from the smelting furnace through the boiler and into the concentrator and pre-concentrator, pipe means for circulating black liquor through the pre-concentrator and concentrator until the desired solid content is reached, heaters for maintaining the highly concentrated black liquor in fluid condition and heated feed means for supplying the concentrated black liquor to the melting furnace.

18. Apparatus for regeneration of black liquor and efficient utilization of its heat content comprising, in combination, a combined smelter and boiler unit having a steam generator and a relatively deep smelter bed in spaced relation therebelow, conduits along the sides of the unit for conveying part of the gases from the steam generator region down on top of the smelter bed, spray concentrating apparatus for reducing the water content of black liquor, conduits for directing gases from the steam generator region through said concentrating apparatus to evaporate the black liquor sprayed therein, pipe means for circulating black liquor through the concentrating apparatus until the desired solid content is reached, heating and filtering means to maintain the highly concentrated black liquor in fluid condition and steam jacketed feed means for supplying the concentrated black liquor to the smelter bed, said feed means entering the smelter bed region in the path of the gases tapped off from the steam generator region of the unit.

19. A combined steam generator and smelter furnace unit comprising, in combination, a relatively deep smelter bed, primary and secondary boiler tubes above said smelter bed, conduits extending from the boiler tube region to the smelter bed region along the sides of the furnace for conveying gases from between the primary and secondary boiler tubes down out of contact with the rising burning gases in the smelter to the top of the smelter bed, means for introducing said conveyed gases over the top of the smelter bed and a burner head for fluid fuels positioned in the furnace between the smelter bed and primary boiler tubes.

20. A combined smelter furnace and steam generator comprising a relatively deep smelter bed, primary and secondary boiler tubes above said bed in spaced relation therefrom, secondary air nozzles above said bed, auxiliary fuel beds on the sides of said smelter bed and conduits joining the auxiliary fuel beds with the smelter furnace above the smelter bed for allowing the hot gases from the auxiliary fuel beds to enter into the smelting furnace above the secondary air nozzles.

EDWARD G. GOODELL.